United States Patent
van de Groenendaal

(10) Patent No.: US 7,853,269 B2
(45) Date of Patent: Dec. 14, 2010

(54) SYSTEM AND METHOD FOR PROVIDING WIRELESS NETWORK SERVICES USING THREE-DIMENSIONAL ACCESS ZONES

(75) Inventor: Joannes G. van de Groenendaal, Portland, OR (US)

(73) Assignee: Computer Associates Think, Inc., Islandia, NY (US)

( * ) Notice: Subject to any disclaimer, the term of this patent is extended or adjusted under 35 U.S.C. 154(b) by 598 days.

(21) Appl. No.: 11/749,364

(22) Filed: May 16, 2007

(65) Prior Publication Data
US 2008/0287056 A1     Nov. 20, 2008

(51) Int. Cl.
*H04W 68/00* (2009.01)
(52) U.S. Cl. .................. 455/456.1; 455/457; 342/453
(58) Field of Classification Search ............... 455/456, 455/456.1, 456.2, 456.3, 456.7; 342/450, 342/451, 453, 457
See application file for complete search history.

(56) References Cited

U.S. PATENT DOCUMENTS

| | | | |
|---|---|---|---|
| 6,195,556 B1 * | 2/2001 | Reudink et al. | 455/456.2 |
| 7,423,580 B2 * | 9/2008 | Markhovsky et al. | 342/126 |
| 7,428,411 B2 * | 9/2008 | Zellner | 455/419 |
| 2006/0194588 A1 * | 8/2006 | Zhao | 455/456.1 |

\* cited by examiner

*Primary Examiner*—George Eng
*Assistant Examiner*—Muthuswamy G Manoharan
(74) *Attorney, Agent, or Firm*—Pillsbury Winthrop Shaw Pittman LLP

(57) ABSTRACT

A system and method for providing wireless network services using three-dimensional access zones is provided. One or more sensors may determine signal strength information, distance, or other positional information for wireless devices. An agent may provide information relating to fixed wireless reference points, and may control underlying operating systems for the reference points based on policies defined by a manager. For example, the manager may be coupled to the sensors and to the agent, and may define a three-dimensional coordinate system for a managed environment. By collecting information from the sensors and the agent, the manager may triangulate three-dimensional locations of the wireless devices, and may enforce three-dimensional access zone policies for the wireless network via the agent.

15 Claims, 4 Drawing Sheets

SYSTEM AND METHOD FOR PROVIDING WIRELESS NETWORK SERVICES USING THREE-DIMENSIONAL ACCESS ZONES

FIELD OF THE INVENTION

The invention relates to providing wireless network services using three-dimensional access zones.

BACKGROUND OF THE INVENTION

Wireless networks often transmit data using radio frequency signals. While a wireless network typically covers one or more local or campus networks, with sufficient broadcast power or signal repeaters, the wireless network may cover a very expansive area. In a typical wireless network, coordinating communication between addressable users and interfaces involves similar challenges as confronting in any general communication system (e.g., authorization, load balancing, and quality of service, among other things). Wireless systems, however, often also must contend with challenges associated with transmitting data through the air using radio frequency communication links (e.g., broadcast or unicast). When establishing communication links wirelessly, the risk of unauthorized access increases, especially when security mechanisms place undue reliance on user-generated passwords or other measures that can easily be compromised. As wireless services and wireless devices become more prevalent, these challenges may be compounded as ever larger networks must be managed securely and reliably.

One area of focus for wireless network security relates to positional systems that track positional location information for wireless devices. Adequately tracking the positional information, however, often requires a continuous communication link between the positional system and a device being tracked. For example, problems may occur when a communication link breaks or otherwise becomes interrupted, causing the positional system to lose contact with a tracked wireless device. Sometimes, however, such interruptions may be used as a security measure, as a specific wireless access zone (e.g., a cellular zone) may be used to fiercely manage boundaries of a network (e.g., to exclude non-subscriber traffic).

As such, positional systems have led to more localized applications focusing, for example, on campus-based systems and corporate-based systems. In a corporate-based system, for example, many devices capable of wireless communication may be designed for convenient portability, creating difficulties with dynamically locating and authenticating such devices. For example, designing a secure solution for highly portable wireless devices may include granting access to certain areas, or limiting access to an area based on temporal restrictions, or other location-dependent factors.

However, in organizational environments (e.g., campus or corporate networks), wireless devices may be highly portable in two-dimensional or three-dimensional space. As such, security in these environments often depends on positional systems having reliable positional management in three dimensions. Unlike a typical two-dimensional system, which may easily locate a wireless device on a two-dimensional grid using a two-dimensional map overlay, an organizational-based wireless positional system may need to manage a three-dimensional space (e.g., an office building or other edifice where a wireless device easily moves between floors). Existing systems, however, often limit measures that regulate access to a wireless network based on two-dimensions.

Existing systems suffer from these and other problems.

SUMMARY OF THE INVENTION

According to various aspects of the invention, a system and method for providing wireless network services using three-dimensional access zones may address these and other drawbacks of existing systems. By identifying a wireless networking device in a three-dimensional space, a positional system may track and manage wireless devices in a vertical dimension, as well as along a two-dimensional planar grid.

In various implementations, providing wireless network services using three-dimensional access zones may include one or more wireless network components (e.g., wireless radio frequency sensors) determining signal strength information, distance, or other positional information for wireless devices visible to the components. An agent may be responsible for providing information relating to fixed wireless reference points visible to the agent (e.g., wireless access points), and for controlling underlying operating systems for the reference points based on policies defined by a manager. For example, the manager may be coupled to the network components and the agent, and may define a coordinate system for a managed environment. By collecting information from the network components and the agent, the manager may triangulate three-dimensional locations of the wireless devices, and may enforce three-dimensional access zone policies for the wireless network (e.g., via the agent).

Other objects and advantages of the invention will be apparent to those skilled in the art based on the following drawings and detailed description.

DETAILED DESCRIPTION

Figure 1:
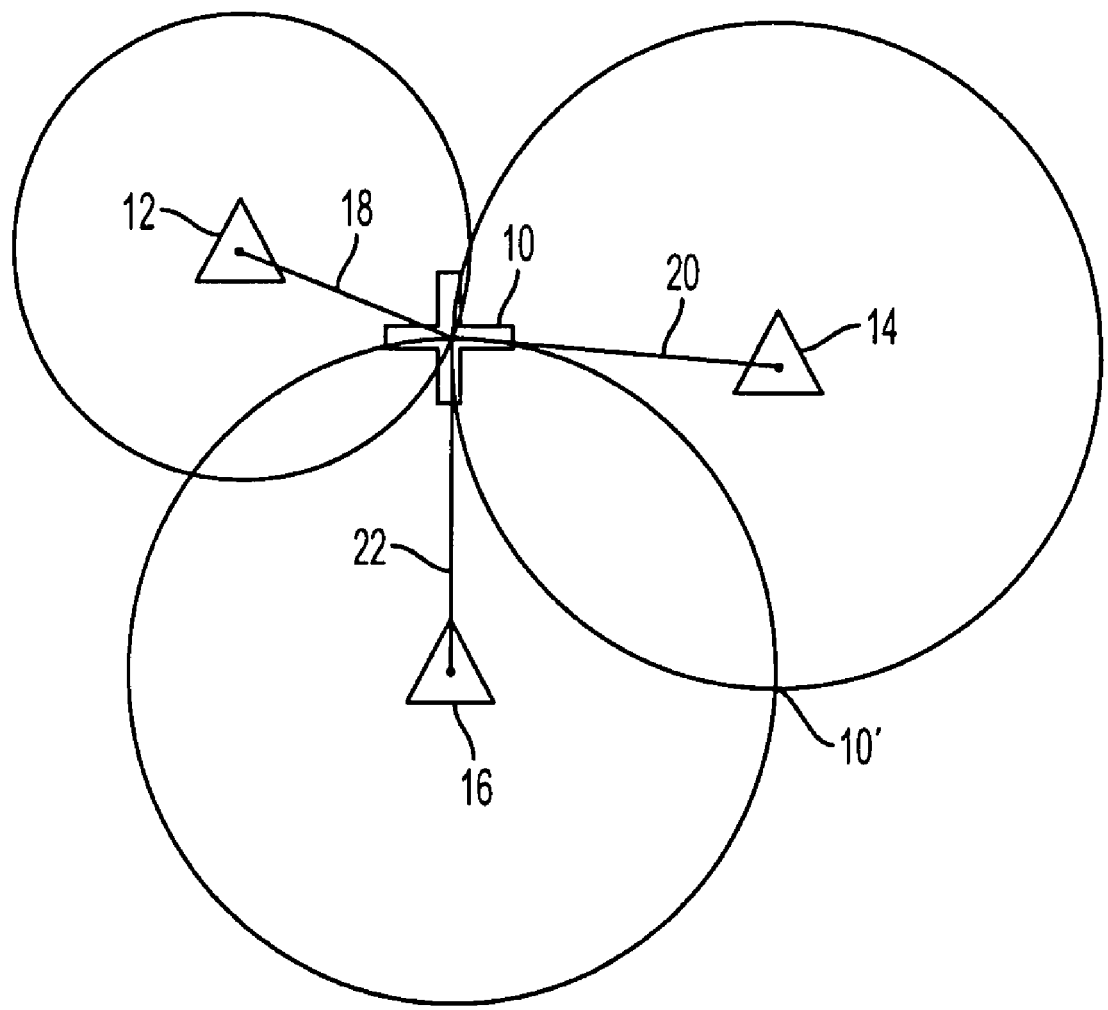
FIG. 1 illustrates an exemplary diagram for determining position information in a two-dimensional plane.

Referring to FIG. 1, an exemplary diagram for determining position information in a two-dimensional plane is illustrated. The diagram shown in FIG. 1 may be used, for example, to determine a planar position for a wireless device in a wireless networking environment. For example, a mobile device 10 can be located in two-dimensions by determining respective distances from a first network reference point 12, a second network reference point 14, and a third network reference point 16, each of which may have a fixed, known location. As an example, reference points 12, 14 and 16 may be wireless access points, repeaters, or other components of a wireless network, while device 10 may be, for example, a laptop computer, a desktop computer having wireless networking equipment, a personal digital assistant, a voice handset, a camera, a portable printer, or any other portable wireless device, as will be apparent.

By determining a distance from device 10 to each of reference points 12, 14 and 16, the two-dimensional physical position of device 10 may be triangulated. For instance, the position of device 10 may be approximated by an intersecting point of three circles having respective centers at the known locations of reference points 12, 14 and 16. As such, the circles may have respective radii 18, 20 and 22 equal to the determined distance to device 10. In various implementations, however, such as when distance measurements have some degree of uncertainty, the circles depicted in FIG. 1 may form an annulus (e.g., a ring-like structure surrounding a joint or segment) to identify the position of device 10 within an intersecting region, rather than an intersecting point.

Further, in various implementations, device 10 can be located using fewer than three reference points. For example, using only reference points 14 and 16, possible locations for device 10 may be either of two points where the two circles having centers at reference points 14 and 16 intersect. In addition to the actual position of device 10, a second possible location may be at location 10'. Depending on the geometry of the positions, location 10' may be excluded as being a non-physical result (e.g., when location 10' falls outside of a building, the location can be excluded as a valid location and the position may be defined as indicated by reference numeral 10). On the other hand, employing a two-dimensional geometric model may introduce other risks for wireless device management, where such a mathematical short-cut for positioning a wireless device may result in an unauthorized device located outside of a building being treated as though it were inside.

When operating in a corporate environment, a service area may include, for example, a building or a collection of buildings, various floor plans and/or facility configurations, among other physical location modeling. Floor plans may further include structural members, non-tenant occupied space on a given floor, certain fixed and/or non-movable office fixtures (e.g., wall partitions, interlocked modular furniture, etc.), among other physical characteristics. As such, wireless network access policies may include modeling routines for defining specific volumes (e.g., to represent certain office fixtures, tenant and/or non-tenant space, or other volumes) assigned to a collection of addressable positions. The policies may thus be coordinated by a positional system that denies access to certain volumes, grants access to certain volumes, limits access based on location and temporal information, or other criteria. By employing a highly detailed three-dimensional coordinate system for the environment, various policies may be designed to regulate the provision of wireless network services based a three-dimensional positional model (e.g., access may be restricted for positions within solid structures, suspended from any means of support, or other inaccessible positions).

Figure 2:
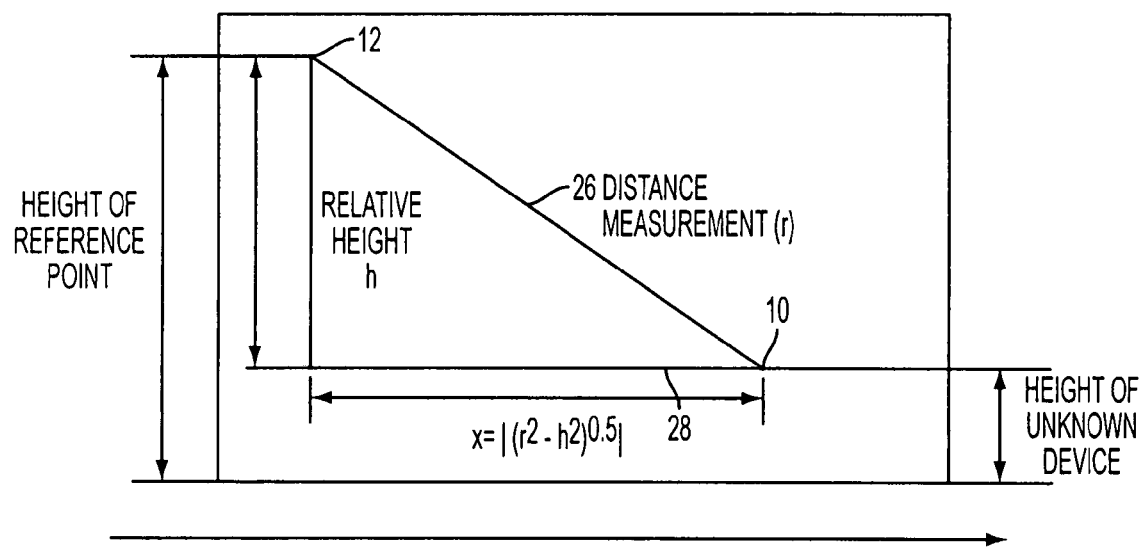
FIG. 2 illustrates an exemplary projection plane for resolving distance in a two-dimensional plane.

A three-dimensional position may sometimes be determined using a two-dimensional model. For example, as illustrated in FIG. 2, a third distance variable may be defined as a projected distance R onto an X-Y plane. A projected distance 26 may depend on an assumed relative height H, denoting a difference between a wireless device 10 and a reference point device 12. As such, using linear equations, a known location for reference point 12, and a projected distance 26 R, a positional system may determine an estimated three-dimensional location for device 10. However, the illustrated X-Y plane only contains knowable planar coordinates for reference point 12 and device 10. A positional system based thereon, therefore, may not always be accurate, as the assumed height H may not necessarily be an actual height, but may instead be based on an assumption that device 10 is located at around desk-height. Accordingly, a positional system attempting to identify a three-dimensional position using a two-dimensional model may not always be adequately precise, varying in proportion to a margin of error based on an accuracy of the assumed height H.

According to various aspects of the invention, a technique for improving precision in a three-dimensional positional system may include introducing a fourth reference point. Using the fourth reference point, four corresponding distance measurements may be determined, providing radii for four individual, intersecting spheres. When modeling a three-dimensional space containing the four spheres, an intersection may be determined, where the intersection may include a point, a line, a plane, or a three-dimensional spatial region, depending on accuracies for the distance measurements.

Position in three-dimensions may be calculated for a wireless device using wireless radio frequency (RF) technology, and may use at least three RF reference points. Each of the RF reference points may represent a known x-y-z coordinate. As with the alternative location possibilities provided by two circles (e.g., as described above), three spheres can provide two intersections, one of which may be excludable using additional known information regarding a layout of a managed space. Measurements may be inaccurate in various instances, however, due to a multi-path problem, where radio frequency signals may be refracted by building materials (e.g., concrete and steel support structures), causing signals to take indirect routes to a receiver, sensor, or other reference point. As a result, the measured distance of travel can be greater than the actual (line-of-sight) distance between a reference point and the device 10.

These and other problems may be addressed by using four or more reference points. As a number of reference points increase, measured distances can be averaged to result in a reasonably accurate determination of a three-dimensional position. For example, in various implementations, additional reference points may be provided using sectored antenna. For example, one type of sectored antenna can provide six horizontal antenna, one top antenna, and one bottom antenna. As such, a single sectored antenna can glean directional information for locating a wireless device that would otherwise require various non-directional antenna. Using FIG. 1 as an example, using sectored antenna instead of a unidirectional sensor may cause the circles depicted therein to be replaced by triangular arcs, such that location 10' could be excluded, thereby definitively locating device 10 using only reference points 14 and 16.

Figure 3:
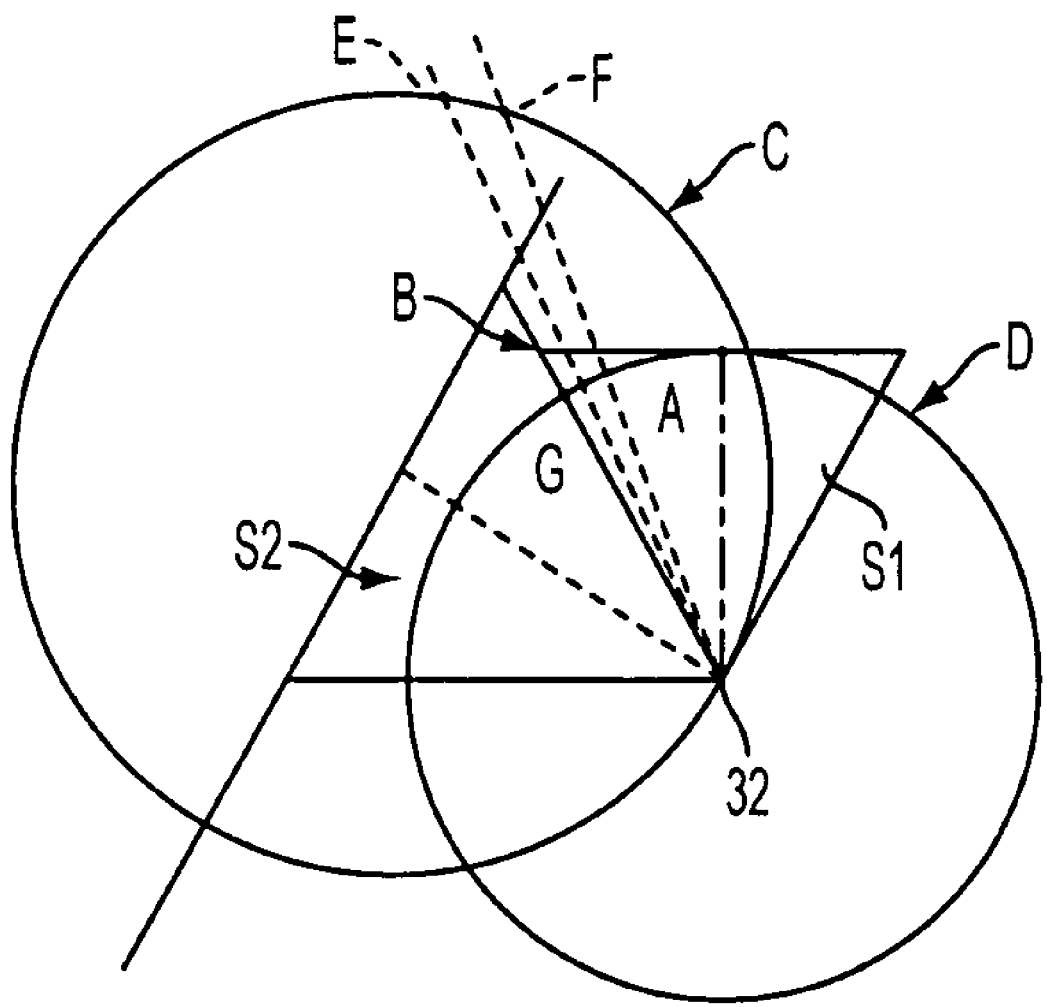
FIG. 3 illustrates an exemplary diagram for determining position information in a three-dimensional managed space using a sectored antenna.

As another example, FIG. 3 illustrates an exemplary diagram for determining position information in a three-dimensional managed space using a sectored antenna 32. Sectored antenna 32 may monitor a plurality of sectors, including, as shown in FIG. 3, a first sector S1 and a second sector S2. It will be apparent, however, that sectored antenna 32 may monitor other numbers of sectors in various implementations, without limitation. By utilizing sectored antenna 32 that detects an unknown device in a plurality of sectors, a location of the unknown device may be narrowed by examining intersections associated with the sectors.

For example, an unknown device may be detected in sector S1 and sector S2, and for purposes of illustration, a received signal strength indicator (RSSI) may be higher in sector S2 than sector S1. Higher RSSI signals may be interpreted as inversely related to distance (e.g., a higher RSSI value corresponds to a shorter distance), such that a distance from antenna 32 to the device may be comparatively less in sector S2 as compared to sector S1. As such, an assumption may be made that the unknown device is located along the circumference of a circle D. Because both sector S2 and S1 have a signal for the device, however, the position can be narrowed to that portion of the circumference of circle D following an arc AG. By contrast, if the signals for sector S1 and S2 had equal signal strengths, the location of the device could be taken as an area near point G (i.e., a location along arc AG where sector S1 and S2 intersect). Because the measured distance from sector antenna 32 to the device is greater in sector S1 than sector S2, a weaker signal bias (i.e., in sector S1) may be used to shift the location of the unknown device along arc AG in area A.

One implementation of such a shift may include constructing a circle C having a radius equal to the distance measured from sectored antenna 32 to the device in sector S1. Because a reading exists in sector S1, circle C may be centered along one or more positions along arc AG (e.g., placing circle C at each of points A and G yields two new points, E and F). Extrapolated lines drawn from the center of circle D (i.e., a location of sectored antenna 32) to each of points E and F may thus define an arc along the circumference of circle D, and the location of the unknown device may be determined as being located along the arc AG.

As will be apparent, the techniques described in the foregoing paragraphs can be extended from circles to spheres in a similar fashion by including the additional sectors. In place of wedges and circles, cones and spheres will be generated for measuring in three-dimensions. Such three-dimensional systems may generally use two cones to determine horizontal distances and direction (i.e., planar coordinates) and another cone pertaining to either a top or bottom sector may be used to determine the vertical inclination (i.e., z-coordinates), further refining the measured location. As described above, when an additional dimension is included, it may generally be useful to add additional reference points in order to render the system fully determined. Otherwise, a managed space may be partitioned into non-physical locations that can be excluded when the managed space is known in advance.

In various implementations, where the location of device 10 remains ambiguous, device 10 or a user of device 10 may be queried to provide location information. In such instances, for security purposes, any response may be confirmed to ensure substantial correspondence to a measured location, and/or additional security information may be required to confirm proper authorization for a specific location or area returned in response to the query.

Once a three-dimensional position has been determined for a device 10, the determined position information may be used to regulate access to wireless network services for device 10. For example, network security may allow a higher level of access to content, administrative functions, or other network services depending on a location of the user. Generally speaking, such security measures may be complemented by traditional network access controls (e.g., user names and passwords). One exemplary implementation for such a system may require authorized personnel to be in a physically secure area of a building prior to accessing sensitive information or administrative network functions. As another example, particular content or services may be provided to a client device depending on a physical location of the client (e.g., in a school building, content related to a specific course may be provided or made available based on a list of courses being taught in each room of the building).

According to various aspects of the invention, wireless network services may thus be provided using three-dimensional access zones. For example, three-dimensional wireless access zones may be used to limit which physical areas users have access to or do not have access to, which times users have access to certain zones, or which systems and protocols users can use in a given zone, among others. In various implementations, a wireless device may be located in a three-dimensional managed space using techniques described above. A manager, an agent, and one or more wireless sensors and/or positioning sensors (e.g., RF sensors) may collectively locate the device in the three-dimensional space to enforce various network security policies. For instance, the agent may be responsible for providing information about fixed wireless reference points that the agent can monitor (e.g., wireless access points), and may further control underlying operating systems based on policies provided by the manager.

The wireless RF sensors may provide signal strength information (or positional information when available) for all wireless devices in a space visible to the sensors. The manager may define a three-dimensional coordinate system for the managed environmental space, and may configure other position-aware devices (e.g., the sensors and agent) with the defined coordinate system. The manager may discover one or more wireless access points (e.g., fixed reference points), as well as wireless devices and sensors deployed within the managed environmental space. The manager may collect signal strength information from the agent and the access points, as well as signal strength information from the sensors for all wireless devices. When available, the manager may also collect relative positional information from position aware sensors. The collected information may be correlated to triangulate a relative location of a client device. Accordingly, the manager may manage and monitor the agent with respect to administrator-defined access-zone policies defined by the administrator, thereby delegating authority to the agent for enforcement the access-zone policies.

The above exemplary implementation illustrates one collection of networked operations to ensure policy enforcement by the agent. Unauthorized, unrecognized, or recognized but partially restricted wireless clients may be denied connectivity to an agent, and thus restricted from wireless network services. Another application of the invention may include tracking assets within a wireless network. If, by way of example, there are four laptop computers, three handheld devices and one desktop computer each connected to the network via a wireless connection, a network administrator (or an administrator module) may determine a physical location of each of those devices in a three-dimensional space at any given time. Likewise, unauthorized or restricted devices may be located and tracked, such that appropriate intervention may be arranged (e.g., termination of connections, physical intervention by security personnel, or other intervention, as will be apparent).

Figure 4:
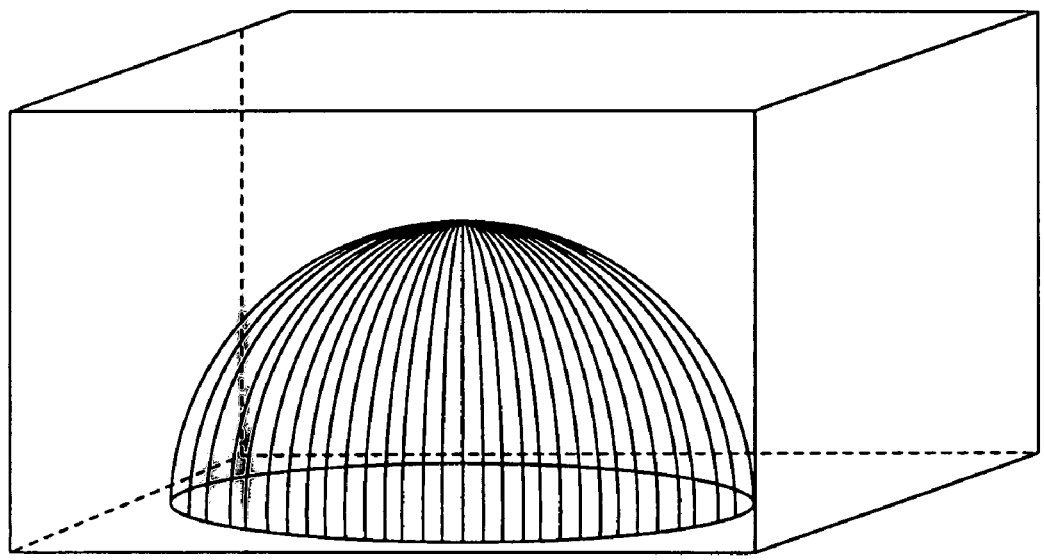
FIGS. 4-5 illustrate exemplary schematic diagrams of three-dimensional access zones.
Figure 5:
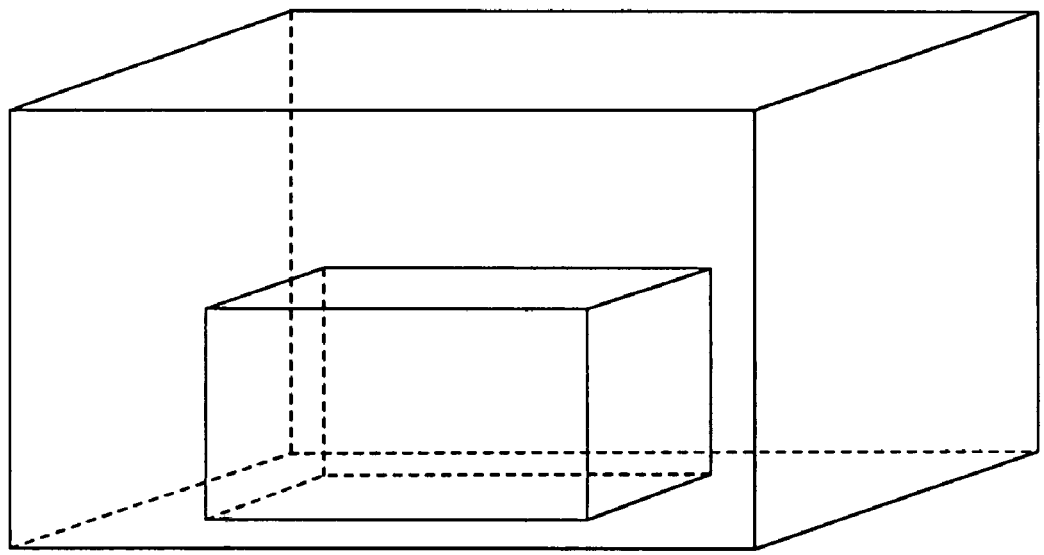

As will be apparent, any number of permissions or security measures can be modified based on a physical location of a device within a wireless network space. Three-dimensional access zones in accordance with various implementations of the invention may take the form of parallelepipeds, spheres, hemispheres, or any other suitable shape, as will be apparent. For example, FIGS. 4-5 generally illustrate two such zones, where FIG. 4 illustrates a hemispherical access zone and FIG. 5 illustrates a parallelepiped access zone. In various implementations, three-dimensional access zones may defined according to shapes that relate to structural shapes within a managed space (e.g., a building, campus or other locale of the wireless network). Thus, in an office or classroom building, parallelepiped zones provide optimal access zone definitions, delimiting the building by floor, room, or other permutations. Further, in another example, spherical zones may be used to exclude certain areas of the building from falling within any zone, or to define overlapping zones (e.g., to allow hybrid network access, such as different levels of access for an instructor and students in a classroom setting).

While the invention has been described with reference to the certain illustrated aspects and implementations, the words used herein are words of description, rather than words of limitation. For example, in general the devices described herein communicate accordance with one of the 802.11 protocols, but the invention is not limited to such communications, but instead is generally applicable to wireless communications networks.

Implementations of the invention may be made in hardware, firmware, software, or any combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, those skilled in the art will recognize that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it is understood that it is within the knowledge of one skilled in the art to effect such feature, structure, or characteristic in connection with other aspects or implementations whether or not explicitly described. Thus, various changes and modifications may be made, without departing from the scope and spirit of the invention. The specification and drawings are to be regarded as exemplary only, and the scope of the invention is to be determined solely by the appended claims.

What is claimed is:

1. A method for providing wireless network services using three-dimensional access zones, comprising:
    defining a three-dimensional managed network space, wherein the three-dimensional managed network space includes four or more reference point devices having known three-dimensional positions within the three-dimensional managed network space;
    determining a three-dimensional position within the three-dimensional managed network space for a wireless networking device visible to the four or more reference point devices, wherein determining the three-dimensional position for the wireless networking device includes:
        calculating relative distances from the wireless networking device to the four or more reference point devices, wherein the relative distances calculated from the wireless networking device to the four or more reference point devices provide relative radii for four or more individual spheres respectively centered at the four or more reference point devices, and wherein at least one of the four or more reference point devices includes a sectored antenna having a plurality of directional antenna that calculate the relative distance from the wireless networking device to the at least one reference point device, and wherein calculating the relative distances from the wireless networking device to the four or more reference point devices includes:
            collecting relative distances, relative directions, and relative strengths for signals received from the wireless networking device in sectors visible to two or more of the plurality of directional antenna, wherein the relative distances and the relative directions collected for the signals in the sectors visible to the two or more directional antenna provide possible positions for the wireless networking device along a circular arc; and
            adjusting the possible positions for the wireless networking device along the circular arc based on the relative strengths collected for the signals received in the sectors visible to the two or more directional antenna, wherein the three-dimensional position determined for the wireless networking device comprises a location within the three-dimensional managed network space where the four or more individual spheres intersect along the circular arc; and
    enforcing one or more policies to determine whether to provide the wireless networking device access to the three-dimensional managed network space based on the three-dimensional position determined for the wireless networking device.

2. The method of claim 1, wherein calculating the relative distances from the wireless networking device to the four or more reference point devices includes collecting relative strengths for wireless radio frequency signals received from the wireless networking device at the four or more reference point devices.

3. The method of claim 1, wherein the four or more reference point devices include position-aware sensors that calculate the relative distances from the wireless networking device to the four or more reference point devices.

4. The method of claim 1, wherein determining the three-dimensional position for the wireless networking device further includes:
    determining a plurality of possible three-dimensional positions for the wireless networking device within the three-dimensional managed network space based on the relative distances calculated from the wireless networking device to the four or more reference point devices; and
    eliminating one or more of the plurality of possible three-dimensional positions for the wireless network device in response to determining that the one or more possible three-dimensional positions represent non-physical locations within the three-dimensional managed network space.

5. The method of claim 4, wherein the three-dimensional managed network space includes a three-dimensional coordinate system that defines the non-physical locations.

6. The method of claim 1, wherein determining the three-dimensional position for the wireless networking device further includes querying the wireless networking device to provide the three-dimensional position for the wireless networking device in response to detecting ambiguity in the location where the four or more individual spheres intersect.

7. The method of claim 6, wherein querying the wireless networking device to provide the three-dimensional position for the wireless networking device includes confirming that the three-dimensional position provided in a response to the query substantially corresponds to the ambiguous location where the four or more individual spheres intersect.

8. The method of claim 6, wherein querying the wireless networking device to provide the three-dimensional position for the wireless networking device includes confirming that the wireless networking device has proper authorization to access the three-dimensional managed network space from the three-dimensional position provided in a response to the query.

9. The method of claim 1, wherein the one or more policies control access to the three-dimensional managed network space based on one or more of an identity for a user of the wireless networking device, an identity for the wireless networking device, temporal authorizations for the user of the wireless networking device, or temporal authorizations for the wireless networking device.

10. A system for providing wireless network services using three-dimensional access zones, comprising:
   a three-dimensional managed network space;
   a plurality of reference point devices within the three-dimensional managed network space, wherein the plurality of reference point devices have known three-dimensional positions within the three-dimensional managed network space; and
   a controller coupled to the plurality of reference point devices, wherein the controller includes one or more processors operable to:
      store a three-dimensional coordinate system for the three-dimensional managed network space, wherein the three-dimensional coordinate system defines valid three-dimensional locations and invalid three-dimensional locations within the three-dimensional managed network space;
      detect a wireless networking device visible to three of the plurality of reference point devices;
      calculate relative distances from the wireless networking device to the three reference point devices, wherein the relative distances calculated from the wireless networking device to the three reference point devices provide relative radii for three individual spheres respectively centered at the three reference point devices, and wherein at least one of the three reference point devices includes a sectored antenna having a plurality of directional antenna that calculate the relative distance from the wireless networking device to the at least one reference point device;
      collect relative distances, relative directions, and relative strengths for signals received from the wireless networking device in sectors visible to two or more of the plurality of directional antenna, wherein the relative distances and the relative directions collected for the signals in the sectors visible to the two or more directional antenna provide possible positions for the wireless networking device along a circular arc;
      adjust the possible positions for the wireless networking device along the circular arc based on the relative strengths collected for the signals received in the sectors visible to the two or more directional antenna, wherein the wireless networking device has a three-dimensional position within the three-dimensional managed network space that corresponds to one of two possible locations where the four or more individual spheres intersect along the circular arc;
      eliminate one of the two possible locations from being the three-dimensional position for the wireless network device in response to the eliminated possible location being located within the invalid three-dimensional locations defined in the three-dimensional coordinate system; and
      determine that the other possible location provides the three-dimensional position for the wireless networking device within the three-dimensional managed network space in response to the other possible location being located within the valid three-dimensional locations defined in the three-dimensional coordinate system.

11. The system of claim 10, wherein the one or more processors are further operable to enforce one or more policies to determine whether to provide the wireless networking device access to the three-dimensional managed network space based on the three-dimensional position determined for the wireless networking device.

12. A method for providing wireless network services using three-dimensional access zones, comprising:
   defining a three-dimensional managed network space, wherein the three-dimensional managed network space includes a reference point device having a known three-dimensional position within the three-dimensional managed network space, wherein the reference point device includes a sectored antenna having a plurality of horizontal directional antenna and a plurality of vertical directional antenna;
   determining a three-dimensional position within the three-dimensional managed network space for a wireless networking device visible to the reference point device, wherein determining the three-dimensional position for the wireless networking device includes:
      calculating relative distances, relative directions, and relative strengths from for signals received from the wireless networking device in sectors visible to one or more of the horizontal directional antenna, wherein the relative distances and the relative directions calculated from the signals received in the sectors visible to the horizontal directional antenna provide possible planar positions for the wireless networking device;
      adjusting the possible planar positions for the wireless networking device based on the relative strengths calculated from the signals received in the sectors visible to the horizontal directional antenna;
      calculating relative distances, relative directions, and relative strengths from signal, received from the wireless networking device in sectors visible to one or more of the vertical directional antenna, wherein the relative distances and the relative directions calculated from the signals received in the sectors visible to the vertical directional antenna provide possible vertical inclinations for the wireless networking device; and
      adjusting the possible vertical inclinations for the wireless networking device based on the relative strengths calculated from the signals received in the sectors visible to the vertical directional antenna, wherein the three-dimensional position determined for the wireless networking device comprises a location within the three-dimensional managed network space where the adjusted possible planar positions and the adjusted possible vertical inclinations for the wireless networking device intersect.

13. A system for providing wireless network services using three-dimensional access zones, comprising:
   a three-dimensional managed network space;
   a reference point device having a known three-dimensional position within the three-dimensional managed network space, wherein the reference point device includes a sectored antenna having a plurality of horizontal directional antenna and a plurality of vertical directional antenna; and a controller coupled to the reference point device, wherein the controller includes one or more processors operable to:

detect a wireless networking device visible to the reference point device;

calculate relative distances, relative directions, and relative strengths from signals received from the wireless networking device in sectors visible to one or more of the horizontal directional antenna, wherein the relative distances and the relative directions calculated from the signals received in the sectors visible to the horizontal directional antenna provide possible planar positions for the wireless networking device;

adjust the possible planar positions for the wireless networking device based on the relative strengths calculated from the signals received in the sectors visible to the horizontal directional antenna;

calculate relative distances, relative directions, and relative strengths from signals received from the wireless networking device in sectors visible to one or more of the vertical directional antenna, wherein the relative distances and the relative directions calculated from the signals received in the sectors visible to the vertical directional antenna provide possible vertical inclinations for the wireless networking device;

adjust the possible vertical inclinations for the wireless networking device based on the relative strengths calculated from the signals received in the sectors visible to the vertical directional antenna; and determine a three-dimensional position for the wireless networking device, wherein the three-dimensional position determined for the wireless networking device comprises a location within the three-dimensional managed network space where the adjusted possible planar positions and the adjusted possible vertical inclinations for the wireless networking device intersect.

14. A system for providing wireless network services using three-dimensional access zones, comprising:

a three-dimensional managed network space, wherein the three-dimensional managed network space includes four or more reference point devices having known three-dimensional positions within the three-dimensional managed network space; and a controller coupled to the plurality of reference point devices, wherein the controller includes one or more processors operable to:

detect a wireless networking device visible to the four or more reference point devices in response to the four or more reference point devices receiving signals from the wireless networking device;

calculate relative distances from the wireless networking device to the four or more reference point devices, wherein the relative distances calculated from the wireless networking device to the four or more reference point devices provide relative radii for four or more individual spheres respectively centered at the four or more reference point devices, and wherein at least one of the four or more reference point devices includes a sectored antenna having a plurality of directional antenna that calculate the relative distance from the wireless networking device to the at least one reference point device, and wherein to calculate the relative distances from the wireless networking device to the four or more reference point devices, the one or more processors are further operable to:

collect relative distances, relative directions, and relative strengths for the signals received from the wireless networking device in sectors visible to two or more of the plurality of directional antenna, wherein the relative distances and the relative directions collected for the signals in the sectors visible to the two or more directional antenna provide possible positions for the wireless networking device along a circular arc; and adjust the possible positions for the wireless networking device along the circular arc based on the relative strengths collected for the signals received in the sectors visible to the two or more directional antenna;

determine a three-dimensional position for the wireless networking device, wherein the three-dimensional position determined for the wireless networking device comprises a location within the three-dimensional managed network space where the four or more individual spheres intersect along the circular arc; and enforce one or more policies to determine whether to provide the wireless networking device access to the three-dimensional managed network space based on the three-dimensional position determined for the wireless networking device.

15. A method for providing wireless network services using three-dimensional access zones, comprising:

defining a three-dimensional managed network space, wherein the three-dimensional managed network space includes a plurality of reference point devices having known three-dimensional positions within the three-dimensional managed network space;

storing a three-dimensional coordinate system for the three-dimensional managed network space, wherein the three-dimensional coordinate system defines valid three-dimensional locations and invalid three-dimensional locations within the three-dimensional managed network space; and determining a three-dimensional position within the three-dimensional managed network space for a wireless networking device visible to three of the plurality of reference point devices, wherein determining the three-dimensional position for the wireless networking device includes:

calculating relative distances from the wireless networking device to the three reference point devices, wherein the relative distances calculated from the wireless networking device to the three reference point devices provide relative radii for three individual spheres respectively centered at the three reference point devices, and wherein at least one of the three reference point devices includes a sectored antenna having a plurality of directional antenna that calculate the relative distance from the wireless networking device to the at least one reference point device;

collecting relative distances, relative directions, and relative strengths for signals received from the wireless networking device in sectors visible to two or more of the plurality of directional antenna, wherein the relative distances and the relative directions collected for the signals in the sectors visible to the two or more directional antenna provide possible positions for the wireless networking device along a circular arc;

adjusting the possible positions for the wireless networking device along the circular arc based on the relative strengths collected for the signals received in the sectors visible to the two or more directional antenna, wherein the three-dimensional position for the wireless networking device corresponds to one of two possible locations where the four or more individual spheres intersect along the circular arc;

eliminating one of the two possible locations from being the three-dimensional position for the wireless network device in response to the eliminated possible location being located within the invalid three-dimensional locations defined in the three-dimensional coordinate system; and determining that the other possible location provides the three-dimensional position for the wireless networking device within the three-dimensional managed network space in response to the other possible location being located within the valid three-dimensional locations defined in the three-dimensional coordinate system.

* * * * *